United States Patent [19]

Bonzack

[11] 4,010,841

[45] Mar. 8, 1977

[54] FORKED WORK-CARRIER CONVEYOR MECHANISM

[75] Inventor: Eugene P. Bonzack, Livonia, Mich.

[73] Assignee: F. Jos. Lamb Company, Warren, Mich.

[22] Filed: Mar. 21, 1975

[21] Appl. No.: 560,716

[52] U.S. Cl. ............................. 198/357; 198/531
[51] Int. Cl.² ..................................... B65G 47/00
[58] Field of Search ............ 198/26, 21, 177 R, 63, 198/52; 141/168, 176

[56] References Cited

UNITED STATES PATENTS 3,295,635  1/1967  Cahn ........................... 198/177 R

FOREIGN PATENTS OR APPLICATIONS 785,297  10/1957  United Kingdom ........... 198/177 R Primary Examiner—Evon C. Blunk
Assistant Examiner—Douglas D. Watts
Attorney, Agent, or Firm—Barnes, Kisselle, Raisch & Choate

[57] ABSTRACT

A conveyor mechanism for workpieces having an enlarged head and a depending stem of smaller section comprising a plurality of forked carriers movable along a predetermined path of travel. The carriers have arms extending transversely of their path of travel. The arm on the trailing side of the carrier being longer than the arm on the leading side of the carrier so that the longer arm is adapted to deflect workpieces from a loading station onto the carrier and deflect a workpiece off the carrier at a conveyor unloading station.

15 Claims, 7 Drawing Figures

FORKED WORK-CARRIER CONVEYOR MECHANISM

The present invention relates to a workpiece handling conveyor and related loading and unloading mechanisms. It is particularly directed to the handling of workpieces which have a head or enlarged portion and a stem or elongated portion. These workpieces are distinguished by their ability to be held in an upright position by being supported on fingers or rails which are disposed beneath the head or enlargement.

Many workpieces when conveyed between successive manufacturing operations must be handled individually. This is a requirement where the workpieces are at such a state of manufacture that any rough handling will cause damage detrimental to further processing. This damage is usually caused by the parts impinging on each other or against the handling equipment itself.

In the past, such workpieces that required gentle handling were usually placed in containers capable of accommodating a plurality or workpieces and which, by the use of dividers, separated the individual parts in a manner to prevent any contact with each other. The containers were then either hand carried or transported by some conveying means to the next operation. It can be seen that this method was laborious and expensive.

The present invention is directed to a conveyor mechanism for conveying fragile workpieces, the conveyor mechanism being adapted to have multiple work loading and unloading stations. The workpieces have an enlarged head and a depending stem and are carried individually in the confines of conveyor-supported forked carriers that are selectively loaded on demand at a low level and discharged at a higher elevation. Arranging the loading station at a low level allows the workpieces to flow by gravity from the machine that has completed the last operation and the placing of the discharge station at a higher elevation permits the workpieces to again travel by gravity from the discharge station to the machine performing the next operation.

In accordance with the present invention, when a carrier conveying a workpiece approaches a loading station, the workpiece on the carrier is detected and the loader is prevented from attempting to insert a second workpiece on the carrier. This arrangement permits the utilization of several loading stations spaced along the single line of carriers. Several discharge stations are located along the elevated portion of the conveyor that may be either manually or automatically shifted to unload the workpieces at the different machines upon demand.

It is an object of this invention to provide a conveying system for handling headed fragile workpieces.

It is a further object to provide a unique apparatus to load and unload a workpiece-handling conveyor.

Further objects and advantages of the present invention will be apparent to those skilled in the art by the following description with reference to the accompanying drawings, in which.

Figure 1:
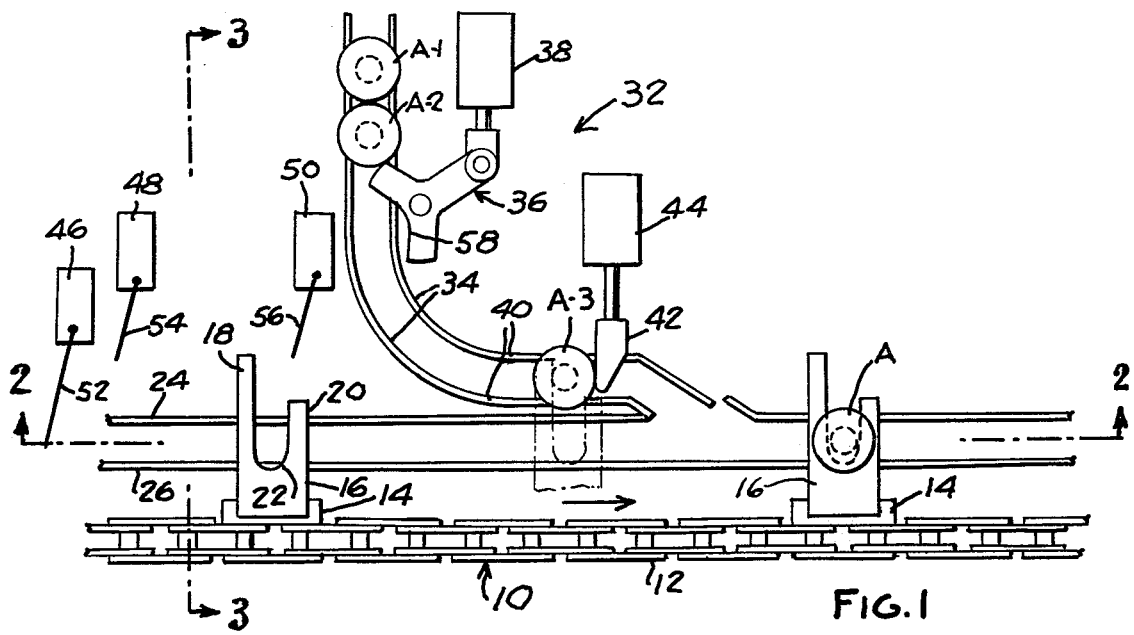
FIG. 1 is a plan view of a conveyor and loading mechanism of the present invention.

The conveyor mechanism of the present invention includes a chain assembly 10 consisting of an endless chain 12, a plurality of adapter links 14 which are reqularly spaced along chain 12, and carrier forks 16 mounted one on each of the adapter links 14. Each carrier fork 16 comprises a pair of spaced arms 18,20 which define therebetween a fork socket 22. In the arrangement illustrated in FIG. 1 chain 12 is driven in a direction toward the right and the trailing arm 18 of carrier 16 extends laterally beyond the end of the leading arm 20. Both arms 18,20 overlie a pair of parallel spaced guide rails 24,26. Carriers 16 are adapted to support and convey workpieces A having an enlarged head 28 and a depending stem 30 of smaller cross section than head 28. The workpieces A are supported by the arms of carriers 16 in the manner illustrated in FIG. 2. Arm 18 extends laterally beyond the end of arm 20 a distance at least slightly greater than the diameter of the stems 30 of the workpieces.

Figure 2:
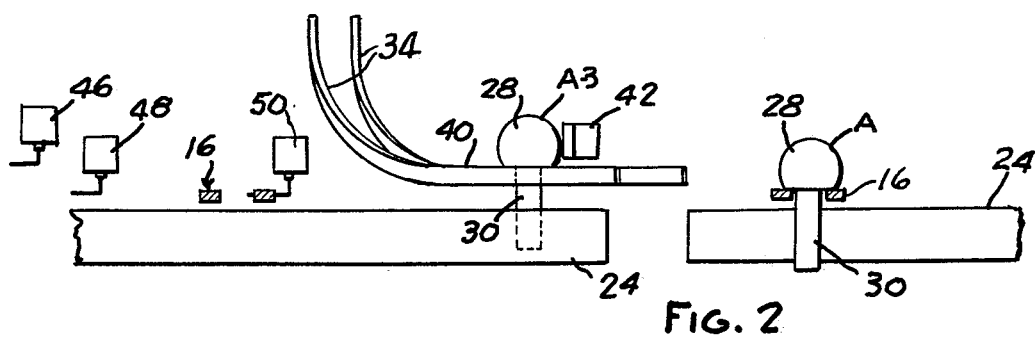
FIG. 2 is a section view along the line 2—2 of FIG. 1.
Figure 3:
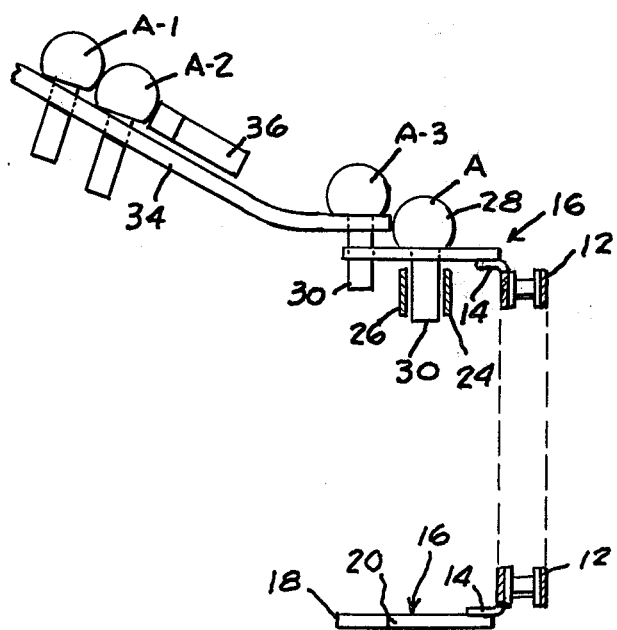
FIG. 3 is a sectional view along the line 3—3 of FIG. 1.

In FIGS. 1, 2 and 3 workpieces A-1, A-2 and A-3 are at rest at a loading station generally designated 32. Workpieces A-1 and A-2 are retained on a pair of downwardly inclined tracks 34 by an escapement fork 36 which is arranged to be rotated in opposite directions by a cylinder 38. In the normal arrangement the workpieces A are supplied to tracks 34 from a machine which has performed an operation on the workpieces. Workpiece A-3 has previously been released by escapement 36 and has traveled by gravity down tracks 34 to a pick up position on a horizontally extending portion 40 of tracks 34 where its movement is arrested by a locator 42 arranged to be reciprocated by a cylinder 44. Beyond locator 42 the portion 40 of the tracks is inclined at an acute angle toward guide rails 24,26.

Upstream of locator 42 there are arranged a workpiece switch 46, a carrier switch 48 and a reversing switch 50. Carrier switch 46 has its wand 52 located in a horizontal plane so that it will be actuated by the head 28 of a workpiece on a carrier 16 traversing the location of switch 46. The wands 54,56 of switches 48, 50, respectively, are disposed at a lower level than wand 52 and are located in the path of travel of the longer arm 18 of each carrier 16. Switch 46 comprises a pair of normally closed contacts which are connected in series with a pair of normally opened contacts in switch 48. When wand 52 is actuated by the head of a workpiece the contacts are opened and when wand 54 is actuated by a carrier the contacts are closed.

When an empty carrier 16 passes under wand 52 of switch 46 it detects the fact that the carrier is empty and, as the carrier advances to the right, it actuates wand 54 of switch 48. The signal from switch 48 actuates cylinders 38,44 to shift escapement 36 and locator 42 to the positions illustrated in FIG. 1. Actuation of cylinder 38 rotates escapement 36 in a counterclockwise direction which causes it to release workpiece A-3 from within the forked portion 58 thereof. Workpieces A-1 and A-2 are restrained by the surface 60 of the escapement. When workpiece A-3 is released by escapement 36 it slides down the track to the position shown in FIG. 1 where its movement is arrested by locator 42.

As carrier 16 advances further in a direction toward the right it actuates wand 56 of switch 50 which cylinder 38 to pivot escapement 36 clockwise and retract locator 42. When escapement 36 pivots clockwise workpiece A-2 will advance into the forked portion 58 of the escapement and will be retained therein until the escapement is rotated counterclockwise by the next actuation of switch 48.

Since locator 42 is retracted and an empty carrier 16 is moving toward the right, when the carrier approaches workpiece A-3 the long arm 18 thereof engages the depending stem 30 of workpiece A-3 as it passes under the horizontally disposed track portion 40. Thus, workpiece A-3 will be guided or deflected by the angularly oriented ends of the horizontally disposed track portion 40 toward the forked socket 58 of the carrier at which point the workpiece will drop slightly and be supported vertically solely by carrier 16. As the carrier advances, the workpiece is retained on the carrier by the confining action of guide rails 24,26 with the depending stem 30 of the workpiece.

While a single loading station 32 has been shown and described, it will be understood that more than one of such stations of duplicate construction can be located along this portion of the conveyor for the purpose of receiving and loading workpieces from several machines. When more than one loading station is used in this manner switches 46,48,50 provide the means required for preventing loading of a carrier if it is already supporting a workpiece placed thereon at a previous station. Thus, assuming that a second loading station 32 is located downstream from the station illustrated in FIG. 1 and the components thereof are in their normal at rest position, locator 42 would be retracted and escapement 36 will have been rotated clockwise from the position shown in FIG. 1 so that it is retaining the first of a line of workpieces in the forked portion 58 thereof. There would be no workpieces on the horizontally extending portion 40 of tracks 34. With the components in this position, when a loaded carrier 16 approaches switch 46 of the second station the head of the workpiece on the loaded carrier actuates wand 52 of switch 46. Switch 48 is located closely adjacent switch 46 and, before switch 46 is deactivated, switch 48 is actuated to maintain the contacts of switch 46 open until the loaded carrier 16 has passed switch 48 completely. This prevents switch 48 from performing its normal function of actuating cylinder 38 and releasing another workpiece to the position for pick up by the forked carrier. Then as carrier 16 advances further it actuates reverse switch 50 and cylinders 38 and 44 remain in the position described above since this is the position that these cylinders will assume when switch 50 is actuated.

Figure 4:
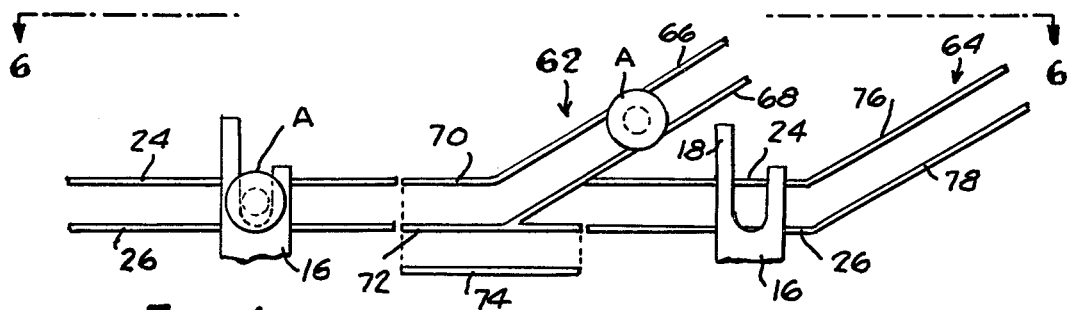
FIG. 4 is a plan view of two discharge stations.

In FIG. 4 two unloading stations 62,64 for the conveyor mechanism are illustrated. The first station 62 comprises a laterally shiftable switch comprising a pair of downwardly inclined tracts 66,68 which are disposed at an acute angle to guide rails 24,26. The upper ends of tracks 66,68 connect with horizontally disposed tracks 70,72 which, in the operative position of the switch, are aligned with rails 24,26, respectively. The switch includes a third track 74 which, when the switch is rendered inoperative, aligns with guide rail 26, at which time track 72 aligns with guide rail 24. Tracks 66,68,70,72,74 are fixedly connected together as an assembly by means not illustrated. This assembly is slideably mounted so that it can be displaced transversely between the positions shown in FIGS. 4 and 5. This displacement may be accomplished manually or by some suitable automatic means responsive to a demand signal.

With the switch at unloading station 62 in the position illustrated in FIG. 4, when a loaded carrier enters the switch the workpiece A therein is guided through tracks 70,72, and, when the depending stem thereof engages tracks 68, the workpiece is deflected out of carrier 16 and will slide down the inclined tracks 68 to a machine for performing the next manufacturing operation on the workpiece. When the switch at station 62 in in the position illustrated in FIG. 5 tracks 72,74 are aligned with rails 24,26 so that a workpiece on an advancing carrier 16 is permitted to pass directly through the switch. At station 64 a second pair of downwardly inclined tracks 76,78 are connected directly with guide rails 24,26. Thus, tracks 76,78 perform the same function as tracks 66,68, except that they direct the workpieces to a second machine.

Figure 5:
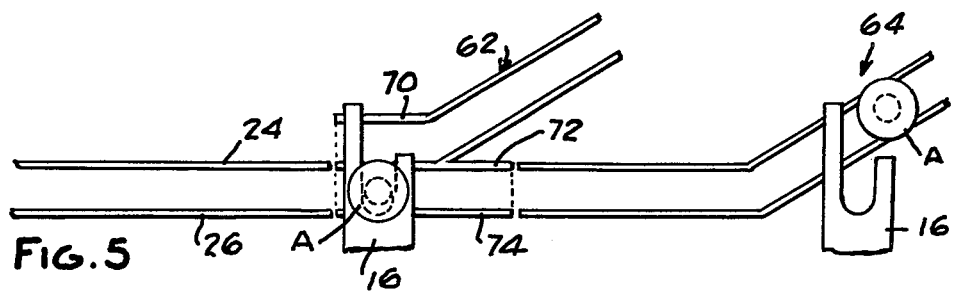
FIG. 5 is a view of the discharge stations shown in FIG. 4 and arranged to discharge at an alternate location.
Figure 6:
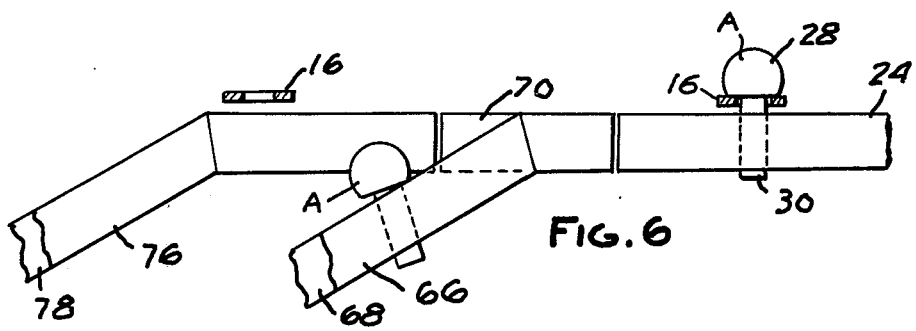
FIG. 6 is an elevational view along the line 6—6 of FIG. 4.

Although a single shiftable switch is shown in FIGS. 4 through 6, will be appreciated that several such switches may be provided at successive unloading stations. In this manner the system can be adapted for supplying workpieces to several machines performing the same manufacturing operations on the workpieces. If all of the shiftable switches at the unloading stations are in the position illustrated in FIG. 5 all of the workpieces will be discharged from the conveyor by the end station 64. If the chute defined by tracks 76,78 becomes filled with workpieces a conventional high level switch can be employed for detecting this condition and stopping the conveyor so that it will not receive or deliver any additional workpieces.

Figure 7:
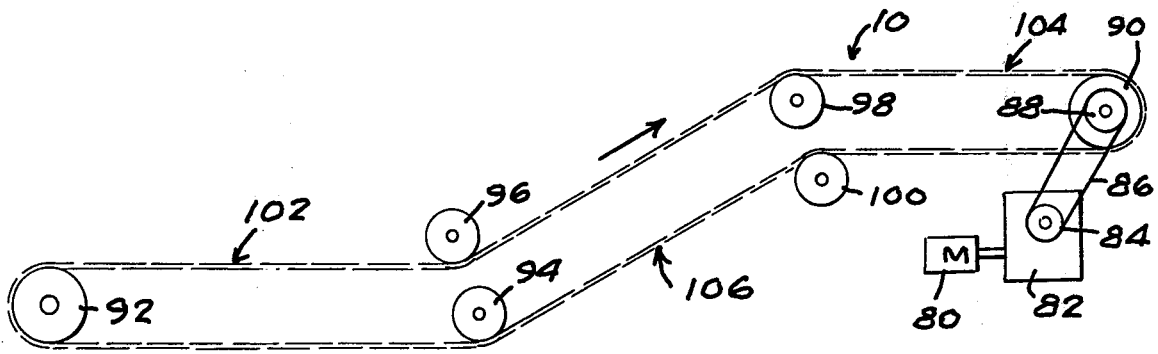
FIG. 7 is a diagrammatic side elevational view of a conveying arrangement of the present invention.

FIG. 7 illustrates diagrammatically the side elevation of a conveyor mechanism which lends itself to the full utilization of the present invention. Motor 80 drives the conveyor chain assembly 10 through a speed reducer 82, a sprocket 84, a drive chain 86, a sprocket 88 and the conveyor drive sprocket 90. The conveyor chain assembly 10 is driven by sprocket 90 and is guided by idler sprockets 92,94,96,98,100. This sprocket arrangement divides the chain assembly into three different sections; namely: a lower horizontally extending section 102, an upper horizontally extending section 104, and an inclined section 106 which connects section 102 and 104. Sections 102 and 104 may be of any desired length and the difference in elevation between these two sections is determined by the requirements between the cooperating machines at the loading and unloading stations. The loading mechanisms illustrated in FIGS. 1 through 3 are located at the lower section 102 so that they can be supplied with workpieces by gravity and the unloading stations illustrated in FIGS. 4 through 6 are located along the upper section 104 so that they can deliver workpieces, again by gravity, to the machines that they are supplying.

I claim:

1. A conveyor mechanism for transporting workpieces of the type having a head and a depending stem of narrower cross section than the head comprising, a plurality of workpiece carriers, conveyor means for causing the carriers to move along a desired path, each carrier having a pair of arms spaced apart in the direction of travel of the carrier to receive the stem of a workpiece therebetween, said carrier being adapted to support the workpiece by engaging the underside of the head of the workpiece with the stem extending downwardly between said arms, the trailing arm on each carrier extending outwardly beyond the free end of the leading arm on the carrier a distance at least equal to the dimension of the workpiece stem in a direction transversely of the path of travel of the carrier, a loading station for said carriers comprising means for delivering workpieces to a pick up position adjacent the path of travel of the carriers and wherein the stem of the workpiece at said work pick up position is located in the path of travel of the trailing arm of a carrier and means at said pick up position cooperating with the trailing arm of the carrier for deflecting the workpiece at said pick up positiion in a generally horizontal plane onto the carrier in response to traversing of the carrier past said pick up position.

2. A conveyor mechanism as called for in claim 1 including detection means upstream of said pick up position in the path of travel of the carriers responsive to passage of a workpiece-loaded carrier past said detection means for preventing said delivery means from delivering a workpiece to said pick up position.

3. A conveyor mechanism as called for in claim 2 including second detection means upstream of said pick up position in the path of travel of the carriers responsive to the passage of an empty carrier past said second detection means for actuating said delivery means to deliver a workpiece to said pick up position.

4. A conveyor mechanism as called for in claim 3 wherein said first-mentioned detection means are positioned to be actuated by a workpiece on a carrier and the second detection means are positioned to be actuated by a carrier.

5. A conveyor mechanism as called for in claim 4 wherein said second detection means are located in said path of travel between said first detection means and said pick up position.

6. A conveyor mechanism as called for in claim 4 wherein the first and second detection means are located in close proximity to each other such that the second detection means are actuated prior to deactivating of the first detection means following actuation of the latter by a workpiece-loaded carrier.

7. A conveyor mechanism as called for in claim 1 including means at said pick up position for supporting a workpiece in a position at least slightly elevated from the position the workpiece assumes when supported on a carrier adjacent said pick up position.

8. A conveyor mechanism as called for in claim 7 wherein said last-mentioned means comprises a pair of spaced, open ended tracks adapted to support the workpiece by engaging the underside of the workpiece head, said tracks extending toward the path of travel of the carriers at an acute angle thereto.

9. A conveyor mechanism as called for in claim 8 wherein the lower edges of said tracks are disposed above the path of travel of the longer arm of said carriers.

10. A conveyor mechanism as called for in claim 1 wherein said conveyor means comprises a power-driven chain on which the carriers are supported.

11. A conveyor mechanism as called for in claim 10 including a pair of guide rails offset laterally from said chain and extending parallel thereto, said rails being vertically aligned with the stem of workpiece supported between the arms of a carrier so as to confine the stem of the workpiece as it is conveyed by the carrier.

12. A conveyor mechanism as called for in claim 1 wherein said delivery means are located at a higher level than said pick up position and including downwardly inclined chute means for guiding each workpiece from said delivery means to said pick up position by means of gravity and a retractable stop for arresting travel of the workpieces at said pick up position.

13. A conveyor mechanism as called for in claim 12 including detection means located upstream of said pick up position for retracting said stop as an empty carrier approaches said pick up position whereby to enable the longer arm of the carrier to deflect a workpiece at the pick up position onto the carrier.

14. A conveyor mechanism as called for in claim 1 including an unloading station in the path of travel of said conveyor means and means at said unloading station engageable with a stem of a carrier-supported workpiece for displacing the workpiece laterally out of supported relation with the carrier arms when a loaded carrier travels past the unloading station.

15. A conveyor mechanism as called for in claim 14 wherein said conveyor means has a first horizontally extending section, a second horizontally extending section at a higher level than the first, and a third inclined section connecting the first and second sections, said loading station being located adjacent said first section and having chute means for delivering workpieces to said pick up position by gravity and said unloading station being located adjacent said second section and having downwardly inclined chute means thereat for conveying workpieces removed from the carriers to a lower discharge point by gravity.

* * * * *